United States Patent
Sethi et al.

(10) Patent No.: US 11,775,819 B2
(45) Date of Patent: Oct. 3, 2023

(54) AUTOMATED CONFIGURATION DETERMINATIONS FOR DATA CENTER DEVICES USING ARTIFICIAL INTELLIGENCE TECHNIQUES

(71) Applicant: Dell Products L.P., Round Rock, TX (US)

(72) Inventors: Parminder Singh Sethi, Punjab (IN); Bijan Kumar Mohanty, Austin, TX (US); Hung T Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 16/867,718

(22) Filed: May 6, 2020

(65) Prior Publication Data

US 2021/0350213 A1    Nov. 11, 2021

(51) Int. Cl.
| | |
|---|---|
| *G06N 3/08* | (2023.01) |
| *H04L 41/0813* | (2022.01) |
| *H04L 41/0806* | (2022.01) |
| *G06N 3/063* | (2023.01) |
| *H04L 41/16* | (2022.01) |
| *G06F 18/21* | (2023.01) |
| *G06N 3/047* | (2023.01) |

(52) U.S. Cl.
CPC ............ *G06N 3/08* (2013.01); *G06F 18/217* (2023.01); *G06N 3/047* (2023.01); *G06N 3/063* (2013.01); *H04L 41/0806* (2013.01); *H04L 41/0813* (2013.01); *H04L 41/16* (2013.01)

(58) Field of Classification Search
CPC .... G06N 3/0472; G06N 3/063; G06N 3/0481; G06N 3/0454; G06N 3/08; G06N 3/047; G06N 3/045; G06N 3/048; G06K 9/6262; G06K 9/6273; H04L 41/0806; H04L 41/0813; H04L 41/16; H04L 41/0895; H04L 41/147; H04L 41/40; H04L 41/0886; G06F 18/217; G06F 18/2414
See application file for complete search history.

(56) References Cited

U.S. PATENT DOCUMENTS

| | | |
|---|---|---|
| 9,503,530 B1 | 11/2016 | Niedzielski |
| 10,203,989 B2 | 2/2019 | Theurer et al. |

(Continued)

FOREIGN PATENT DOCUMENTS

WO     WO 2020249299 A1 * 12/2020 ............. H04L 41/16

*Primary Examiner* — Patrice L Winder
(74) *Attorney, Agent, or Firm* — Ryan, Mason & Lewis, LLP (57) ABSTRACT

Methods, apparatus, and processor-readable storage media for automated configuration determinations for data center devices using artificial intelligence are provided herein. An example computer-implemented method includes obtaining input information pertaining to one or more device-related changes to a data center; obtaining telemetry data attributed to one or more devices in the data center; determining one or more device configurations for implementation in at least one device in the data center in connection with the one or more device-related changes by processing the input information and the obtained telemetry data using one or more artificial intelligence techniques; and performing at least one automated action based at least in part on the one or more determined device configurations.

20 Claims, 8 Drawing Sheets

(56) References Cited

U.S. PATENT DOCUMENTS

| | | | |
|---|---|---|---|
| 10,243,843 B1 | 3/2019 | Niedzielski | |
| 10,521,274 B2 | 12/2019 | Theurer et al. | |
| 11,507,430 B2* | 11/2022 | Subramanian | H04L 41/5003 |
| 2018/0359172 A1* | 12/2018 | Yadav | H04L 41/16 |
| 2019/0197397 A1* | 6/2019 | Verma | G06N 3/08 |
| 2019/0281476 A1* | 9/2019 | Lyon | H04L 41/0823 |
| 2020/0034701 A1* | 1/2020 | Ritter | G06F 9/5005 |
| 2020/0104184 A1* | 4/2020 | Subramanian | G06N 3/08 |
| 2020/0351283 A1* | 11/2020 | Salunke | G06N 20/10 |
| 2020/0380344 A1* | 12/2020 | Lie | G06N 3/08 |
| 2021/0133554 A1* | 5/2021 | Sethi | G06N 3/08 |
| 2021/0241090 A1* | 8/2021 | Chen | G06N 3/08 |
| 2021/0286614 A1* | 9/2021 | Nicolae | H04L 41/082 |
| 2022/0021469 A1* | 1/2022 | Veijalainen et al. | H04L 41/16 709/223 |

* cited by examiner

```
import numpy as np
import random
import gym
from keras.models import Sequential
from keras.layers import Dense, Dropout
from keras.optimizers import Adam from collections import deque class DQN:
    def __init__(self, env):
        self.env     = env
        self.memory  = deque(maxlen=2000)

self.gamma = 0.85
        self.epsilon = 1.0
        self.epsilon_min = 0.01
        self.epsilon_decay = 0.995
        self.learning_rate = 0.005
        self.tau = .125 self.model        = self.create_model()
        self.target_model = self.create_model()

def create_model(self):
        model   = Sequential()
        state_shape  = self.env.observation_space.shape
        model.add(Dense(24, input_dim=state_shape[0], activation="relu"))
        model.add(Dense(48, activation="relu"))
        model.add(Dense(24, activation="relu"))
        model.add(Dense(self.env.action_space.n))
        model.compile(loss="mean_squared_error",
            optimizer=Adam(lr=self.learning_rate))
        return model
```

FIG. 3

```
def act(self, state):
    self.epsilon *= self.epsilon_decay
    self.epsilon = max(self.epsilon_min, self.epsilon)
    if np.random.random() < self.epsilon:
        return self.env.action_space.sample()
    return np.argmax(self.model.predict(state)[0])

def remember(self, state, action, reward, new_state, done):
    self.memory.append([state, action, reward, new_state, done])

def replay(self):
    batch_size = 32
    if len(self.memory) < batch_size:
        return samples = random.sample(self.memory, batch_size)
    for sample in samples:
        state, action, reward, new_state, done = sample
        target = self.target_model.predict(state)
        if done:
            target[0][action] = reward
        else:
            Q_future = max(self.target_model.predict(new_state)[0])
            target[0][action] = reward + Q_future * self.gamma
        self.model.fit(state, target, epochs=1, verbose=0)
```

FIG. 3 (cont.)

```
def target_train(self):
    weights = self.model.get_weights()
    target_weights = self.target_model.get_weights()
    for i in range(len(target_weights)):
        target_weights[i] = weights[i] * self.tau + target_weights[i] * (1 - self.tau)
    self.target_model.set_weights(target_weights)
def save_model(self, fn):
    self.model.save(fn)
def main():
    env     = gym.make("Copy-v0")
    gamma   = 0.9
    epsilon = .95
    trials  = 1000
    trial_len = 500
    # updateTargetNetwork = 1000
    dqn_agent = DQN(env=env)
    steps = []
    for trial in range(trials):
        cur_state = env.reset().reshape(1,2)
        for step in range(trial_len):
            action = dqn_agent.act(cur_state)
            new_state, reward, done, _ = env.step(action)
            # reward = reward if not done else -20
            new_state = new_state.reshape(1,2)
            dqn_agent.remember(cur_state, action, reward, new_state, done)
            dqn_agent.replay()       # internally iterates default (prediction) model
            dqn_agent.target_train() # iterates target model
            cur_state = new_state
            if done:
                break
        if step >= 199:
            print("Failed to complete in trial {}".format(trial))
            if step % 10 == 0:
                dqn_agent.save_model("trial-{}.model".format(trial))
        else:
            print("Completed in {} trials".format(trial))
            dqn_agent.save_model("success.model")
            break
if __name__ == "__main__":
    main()
```

AUTOMATED CONFIGURATION DETERMINATIONS FOR DATA CENTER DEVICES USING ARTIFICIAL INTELLIGENCE TECHNIQUES

FIELD

The field relates generally to information processing systems, and more particularly to techniques for configuring devices in such systems.

BACKGROUND

In many data centers, hundreds or even thousands of devices (e.g., servers, storage devices, network switches, etc.) are connected to a network. These devices can communicate at one or more particular speeds, and relevant network settings can vary (e.g., simplex, half duplex, full duplex, auto-negotiation, etc.). As such, configuration changes to a device can potentially impact the performance of the device and/or the entire data center.

Conventional data center management approaches include manually controlling communication speeds and various settings across devices within a data center. However, such manual techniques are time and labor-intensive, and commonly prone to errors due, for example, to difficulties in accurately monitoring and responding to device changes and device-related configuration changes across a data center.

SUMMARY

Illustrative embodiments of the disclosure provide techniques for automated configuration determinations for data center devices using artificial intelligence (AI). An exemplary computer-implemented method includes obtaining input information pertaining to one or more device-related changes to a data center, and obtaining telemetry data attributed to one or more devices in the data center. The method also includes determining one or more device configurations for implementation in at least one device in the data center in connection with the one or more device-related changes by processing the input information and the obtained telemetry data using one or more artificial intelligence techniques. Further, the method additionally includes performing at least one automated action based at least in part on the one or more determined device configurations.

Illustrative embodiments can provide significant advantages relative to conventional data center management approaches. For example, problems associated with timeliness and errors are overcome in one or more embodiments through determining device configurations by processing device change-related information and device telemetry data using one or more AI techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
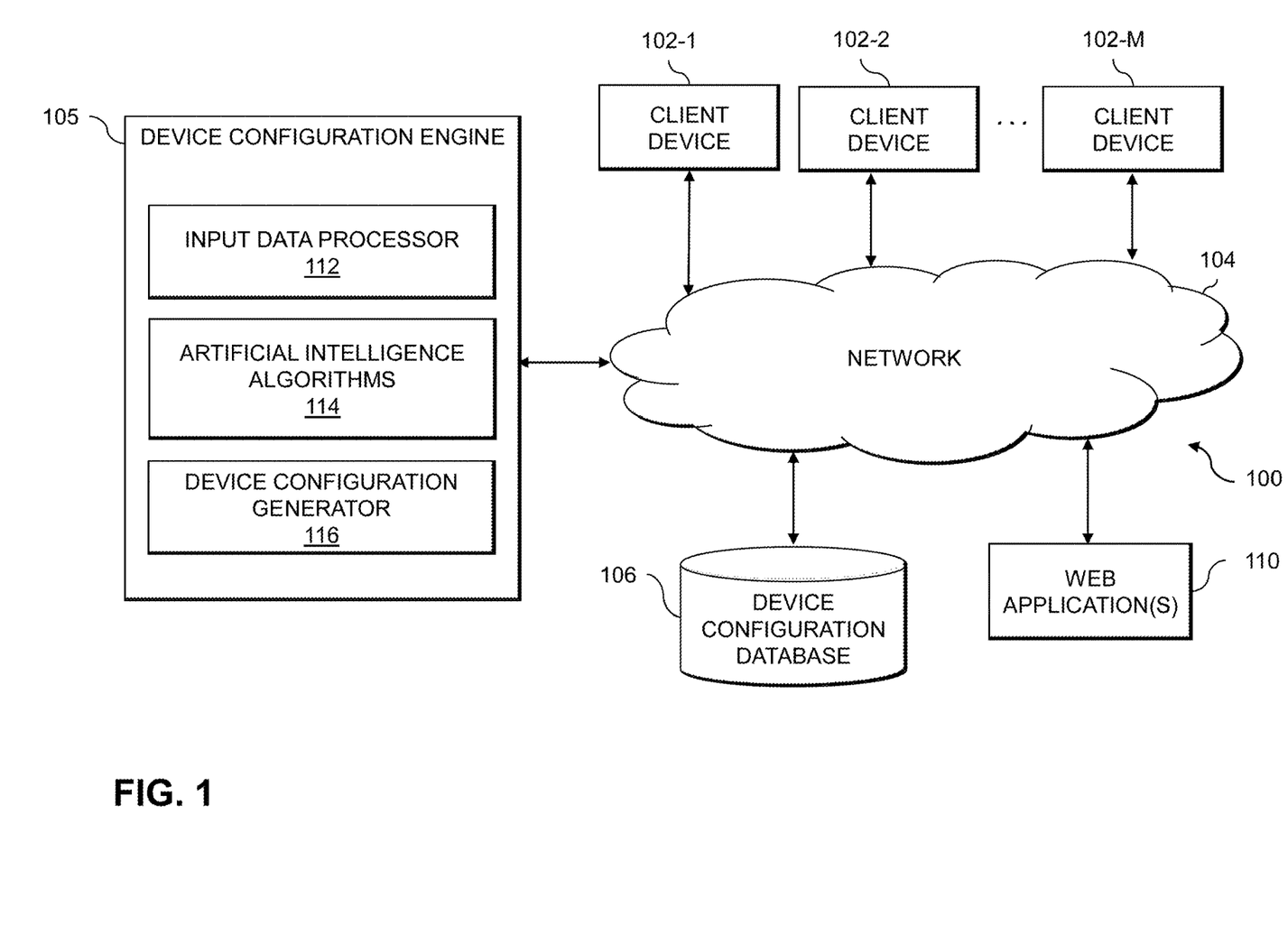
FIG. 1 shows an information processing system configured for automated configuration determinations for data center devices using AI techniques in an illustrative embodiment.

FIG. 1 shows a computer network (also referred to herein as an information processing system) 100 configured in accordance with an illustrative embodiment. The computer network 100 comprises a plurality of client devices 102-1, 102-2, ... 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device configuration engine 105, as well as one or more web applications 110 (e.g., applications pertaining to requesting, processing, and/or pushing device configuration changes, applications pertaining to data center administrator management, etc.).

The client devices 102 may comprise, for example, Internet-of-Things (IoT) devices, devices with one or more IoT sensors embedded therein and/or positioned thereon, mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. By way of example, and as further detailed herein in connection with one or more embodiments, the client devices may be associated with and/or a component of at least one data center. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device configuration engine 105 can have an associated database 106 configured to store data pertaining to device configuration information associated with devices within at least one data center, which comprise, for example, information such as speed negotiable vectors, speed duplex vectors, etc.

The database 106 in the present embodiment is implemented using one or more storage systems associated with the device configuration engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device configuration engine 105 can be input-output devices, which illustratively comprise keyboards, displays or other types of input-output devices in any combination. Such input-output devices can be used, for example, to support one or more user interfaces to the device configuration engine 105, as well as to support communication between the device configuration engine 105 and other related systems and devices not explicitly shown.

Additionally, the device configuration engine 105 in the FIG. 1 embodiment is assumed to be implemented using at least one processing device. Each such processing device generally comprises at least one processor and an associated memory, and implements one or more functional modules for controlling certain features of the device configuration engine 105.

More particularly, the device configuration engine 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the device configuration engine 105 to communicate over the network 104 with the client devices 102, and illustratively comprises one or more conventional transceivers.

The device configuration engine 105 further comprises an input data processor 112, artificial intelligence algorithms 114, and device configuration generator 116.

It is to be appreciated that this particular arrangement of modules 112, 114 and 116 illustrated in the device configuration engine 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated configuration determinations for data center devices using artificial intelligence involving client devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example device configuration engine 105 in computer network 100 will be described in more detail with reference to the flow diagram of FIG. 4.

Accordingly, at least one embodiment includes generating automated configuration determinations for data center devices using deep reinforcement learning (DRL) with at least one deep Q network (DQN) to process data center-related data (e.g., performance-related data) to predict the impact of a configuration change to at least one data center device and/or network component. Such an embodiment, as further detailed herein, includes implementing rewards and penalties for various impacts from configuration change to data center performance. For example, in one or more such embodiments, a configuration system prediction engine is implemented that uses a neural network (e.g., a DQN) along with one or more DRL algorithms to determine and assign, for configuration changes requested by one or more users (e.g., agents), a reward for a positive outcome or impact and a penalty for a negative outcome or impact on data center (e.g., environment) performance. Accordingly, such an embodiment can include optimizing configuration changes for maximum rewards (i.e., the highest data center performance level).

Example configurations considered and/or utilized in one or more embodiments include performance attributes such as auto-negotiation and duplex property of a given device. Auto-negotiation can be on or off, wherein on indicates that the given device is ready to negotiate its speed as per the device which will be sending the data to the given device. Duplex property indicates a setting of half or full as per the situation and/or need, and the duplex property defines whether the negotiation will happen on the receiving side or on both the receiving side and the sending side. In some cases, by way of example, a duplex mismatch occurs when the interface is auto-negotiated and the connection is set to half-duplex, or the auto-negotiation does not provide the optimal outcome.

For example, if a gigabit network card is set to 1000 Megabits per second (Mbps), then there should be no issue as long as the system is connected to a gigabit-capable switch. However, if the system is connected or moved to a switch that is 10/100 Mbps, the system fails to connect. If a system is configured for 100 Mbps/full duplex, and the switch is set to auto-negotiation, then the system only advertises that it is set to 100 Mbps/half duplex. This causes the switch to incorrectly negotiate a half-duplex connection with the system, which causes low throughput and multiple packet collisions. If the system is changed to a half-duplex connection, then the switch negotiates the correct connection and there should be no issues, but the full available throughput of the connection is not used. The same is true if the system is set to 10 Mbps/full duplex or the switch and system configurations are swapped.

As also detailed herein, in at least one embodiment a smart and/or IOT client device sends device telemetry data that measures, for example, hardware performance status (e.g., low, high, or normal) from the one or more device systems providing the performance and/or health state of the data center at a given point of time.

Figure 2:
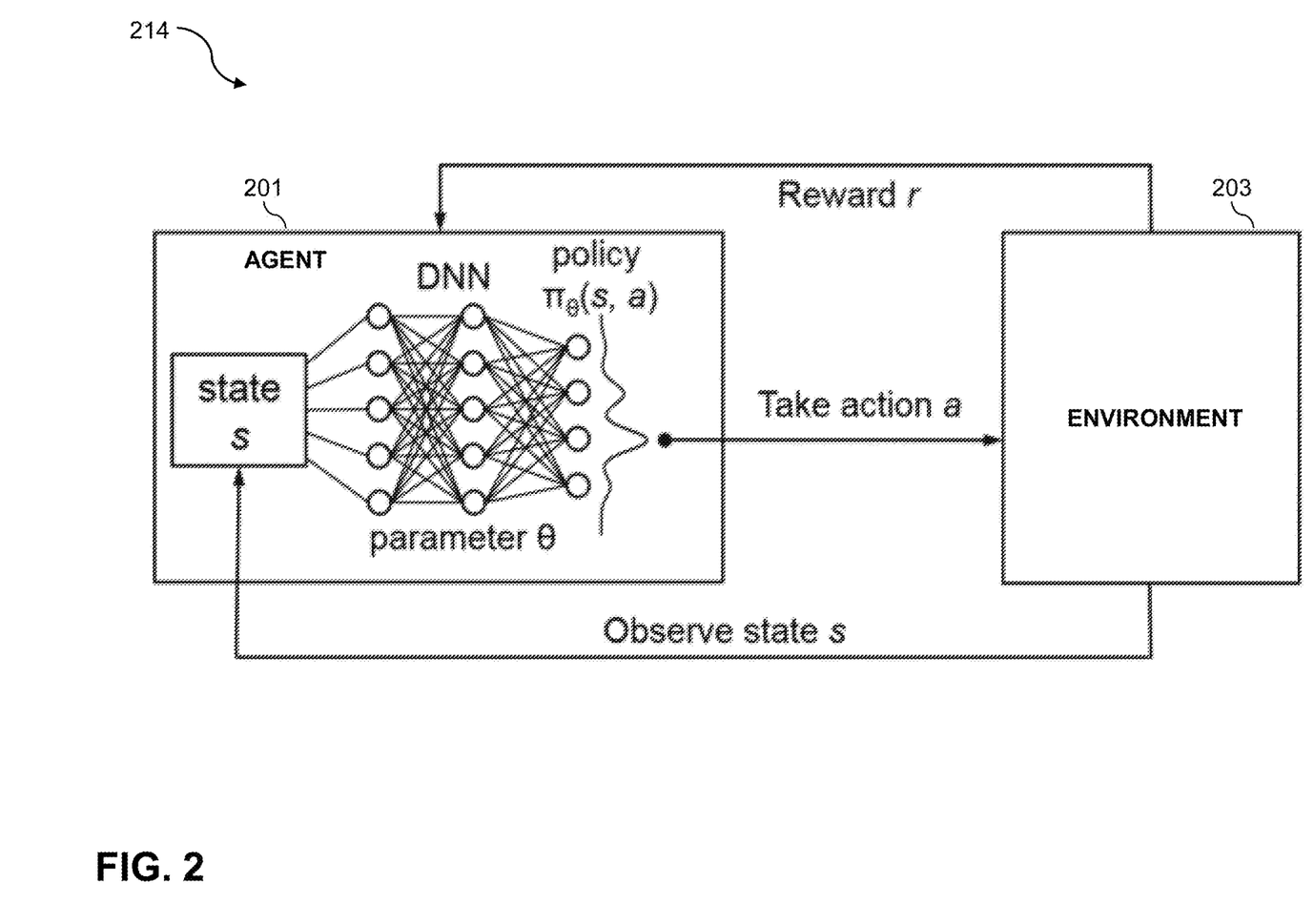
FIG. 2 shows implementation of reinforcement learning with a deep neural network (DNN) in an illustrative embodiment.

FIG. 2 shows implementation of reinforcement learning with a DNN in an illustrative embodiment. By way of illustration, FIG. 2 depicts at least one AI algorithm 214 that includes a DNN (e.g., a DQN) measuring the Q-value (i.e., a quality value in terms of a positive value or a negative value based on a hardware performance status value) of an action (e.g., one or more configuration changes) from an agent 201 (e.g., an administrator) to an environment 203 (e.g., data center performance). Based on the feedback generated by a device configuration engine (e.g., engine 105 in the FIG. 1 embodiment), one or more configuration changes are optimized and pushed by the agent 201 to at least one smart and/or IOT client device (e.g., device 102 in the FIG. 1 embodiment) for update to the device.

Accordingly, in one or more embodiments, smart IOT client devices (e.g., devices with embedded IOT sensors) capture hardware performance status, passing the state of the environment to a cloud-based IOT server for processing as well as learning and/or training of a model. Within the server, a smart configuration engine uses reinforcement learning with a DQN to predict the impact of an action (e.g., a configuration change) to maximize the reward (i.e., the Q-value). The DQN uses Q-learning to determine the best action to take in a given state (i.e., Q-value), and implements a DNN and/or convolutional neural network (CNN) as a function approximator for the Q-learning function. In such an embodiment, configuration values are converted into multi-dimensional vectors by using, for example, Word2Vec or GloVe, and fed to the DNN and/or CNN, wherein the multi-dimensional vectors are passed through multiple convolutional layers, pooling and fully connected linear layers.

In determining and/or calculating a reward, one or more embodiments can include carrying out the following equation:

$$R_t = r_t + \gamma r_{t+1} + \gamma^2 r_{t+2} + \ldots$$

wherein the total reward $R_t$ is the discounted sum of all rewards (r) obtained from time t. Additionally, such an embodiment includes carrying out the following equation:

$$Q(s,a) = \mathbb{E}[R_t]$$

wherein the Q-function captures the expected total future reward that an agent in state s can receive by executing a certain action a.

In at least one embodiment, the neural network is trained (e.g., using device telemetry data, hardware performance status data, etc.), which enables the network to predict the reward value from a current state. For example, a DQN algorithm can include optimizing by remembering the last iteration of the algorithm (i.e., the reward and/or penalty associated with a given action), and replaying from memory. In at least one embodiment, the replay memory data set is randomly sampled and used to train the network. Using replay memory enables such an embodiment to break the correlation between consecutive samples. If the network learned only from consecutive samples of experience as they occurred sequentially in the environment, for example, the samples would be highly correlated and would therefore lead to inefficient learning. Taking random samples from replay memory breaks this correlation and leads to increased accuracy in the final result or probabilities calculation. Accordingly, in one or more embodiments random selection of a data set sample stored in memory is extracted and fed back into the model to calculate its probabilistic outcome using at least one looping algorithm.

During initial iterations, the DQN will try various configuration parameters before searching for a pattern. Once trained, the DQN will attempt to minimize the loss and select the action (i.e., suggest the configuration parameters) that will provide the highest reward. In minimizing a potential loss, such an embodiment can include carrying out the following equation:

$$\text{loss} = \left(r + \gamma \max_{a'} \hat{Q}(s, a') - Q(s, a)\right)^2$$

Figure 3:
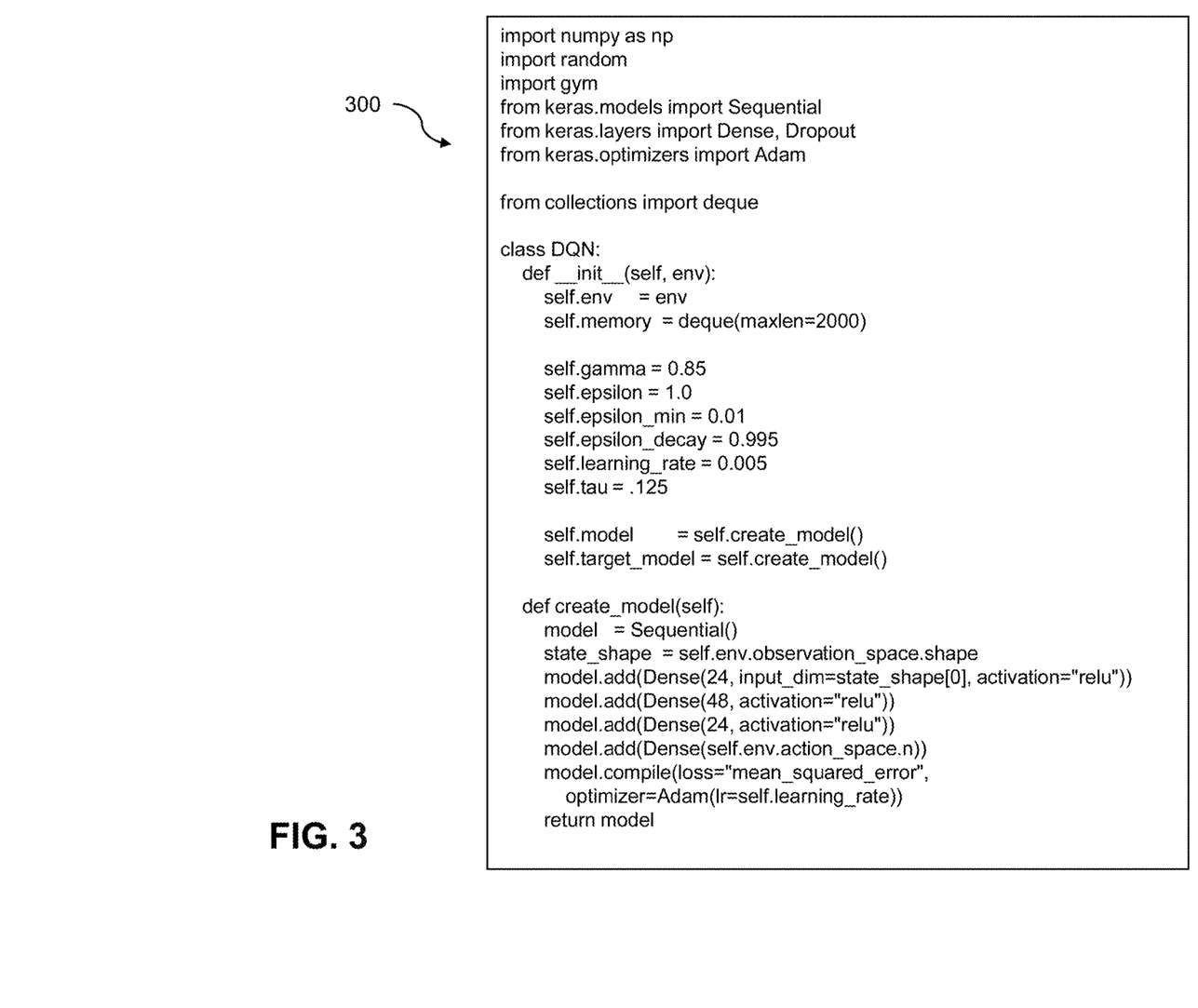
FIG. 3 shows example code snippets for implementing at least a portion of an AI-based prediction algorithm in an illustrative embodiment.

FIG. 3 shows example code snippets for implementing at least a portion of an AI-based prediction algorithm in an illustrative embodiment. In this embodiment, example code snippets 300 are executed by or under the control of at least one processing system and/or device. For example, the example code snippets 300 may be viewed as comprising a portion of a software implementation of at least part of device configuration engine 105 of the FIG. 1 embodiment.

The example code snippets 300 illustrate implementing a DQN, remembering a previous iteration of the algorithm, sampling replaying memory data, and updating the target network based at least in part thereon. Specifically, in code snippets 300, libraries (e.g., NumPy, Keras, etc.) are imported, and once the model is created, an appropriate activation function (e.g., a rectified linear unit (ReLu)) is set with an adaptive optimizing algorithm (e.g., an Adam optimizer). Also, in code snippets 300, remember and replay methods are defined to remember which actions provide the best rewards and which actions return penalties so that such instances can be replayed in future iterations. Further, as also depicted in code snippets 300, the DQN network is updated with multiple trials.

It is to be appreciated that these particular example code snippets show just one example implementation of a portion of an AI-based prediction algorithm, and alternative implementations of the process can be used in other embodiments.

As detailed herein, a configuration prediction engine combines AI techniques (e.g., deep reinforcement learning and DQN with neural networks) to attain accuracy for predicting the impact of a device configuration in a data center that includes multiple devices. Such a combination of AI algorithms is implemented to predict whether a requested configuration change to a data center device will positively or negatively impact the behavior and/or performance of the device and/or the data center as a whole. The generated predictions can be used to tune configuration changes before they are applied. The model of AI algorithms uses deep reinforcement learning, wherein the model learns the behavior of configuration changes in a data center over a period of time via a feedback mechanism. Accordingly, such an embodiment includes improving device and data center behavior and/or performance by optimizing configuration changes, optimizing service level agreement (SLA) performance, minimizing warranty costs, improving customer satisfaction, etc.

Figure 4:
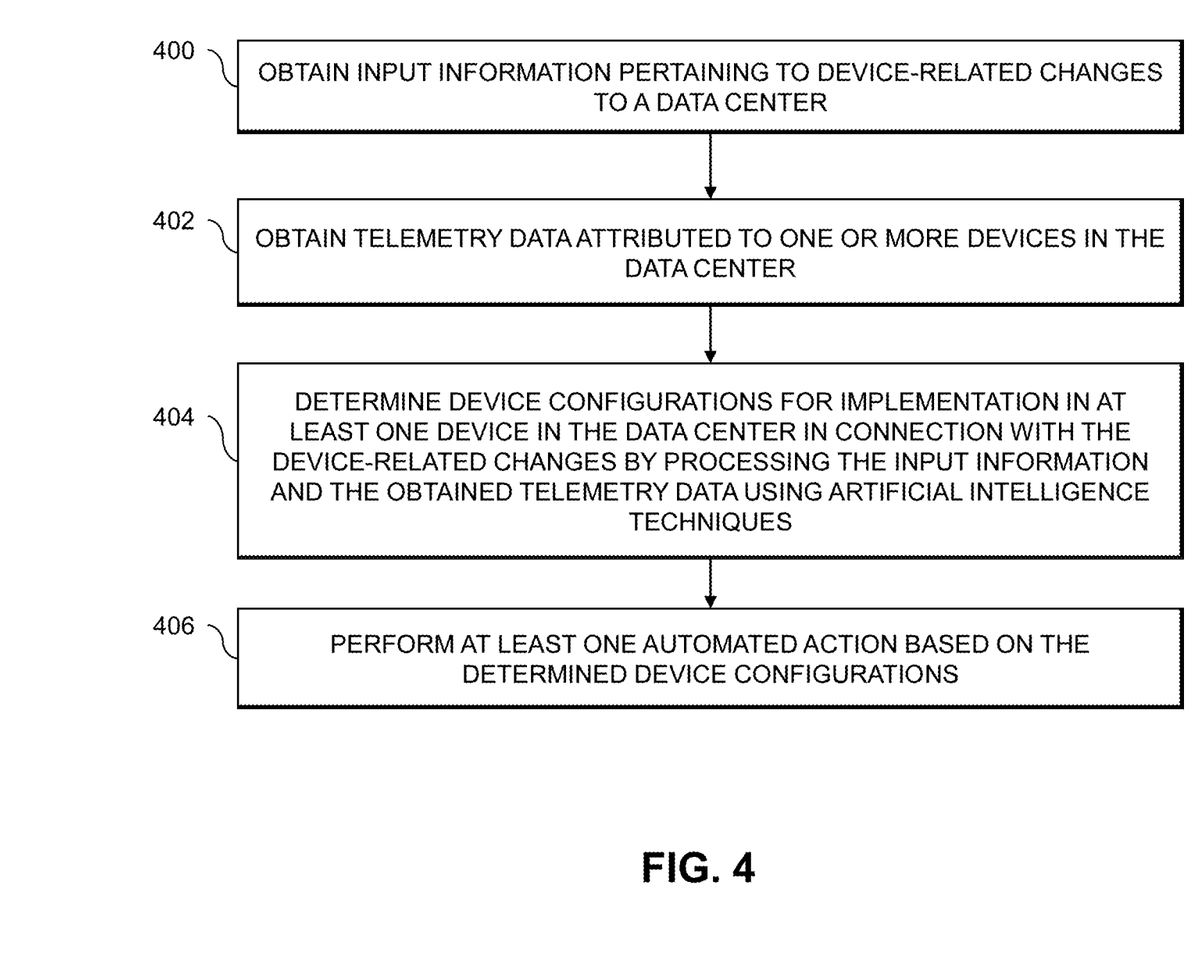
FIG. 4 is a flow diagram of a process for automated configuration determinations for data center devices using AI techniques in an illustrative embodiment.

FIG. 4 is a flow diagram of a process for automated configuration determinations for data center devices using AI techniques in an illustrative embodiment. It is to be understood that this particular process is only an example, and additional or alternative processes can be carried out in other embodiments.

In this embodiment, the process includes steps 400 through 406. These steps are assumed to be performed by the device configuration engine 105 utilizing its modules 112, 114 and 116.

Step 400 includes obtaining input information pertaining to one or more device-related changes to a data center. Step 402 includes obtaining telemetry data attributed to one or more devices in the data center. In at least one embodiment, the telemetry data measure hardware performance status associated with at least lease a portion of the data center at a given point of time.

Step 404 includes determining one or more device configurations for implementation in at least one device in the data center in connection with the one or more device-related changes by processing the input information and the obtained telemetry data using one or more artificial intelligence techniques. In at least one embodiment, processing the input information and the obtained telemetry data using one or more artificial intelligence techniques includes processing the input information and the obtained telemetry data using deep reinforcement learning in conjunction with at least one neural network to predict at least one impact of at least one device configuration change to the at least one device. Further, in such an embodiment, processing the input information and the obtained telemetry data using deep reinforcement learning in conjunction with at least one neural network can include converting at least a portion of the input information and the obtained telemetry data into one or more multi-dimensional vectors. Also, such an embodiment includes providing the one or more multi-dimensional vectors to the at least one neural network, which includes passing the one or more multi-dimensional vectors through one or more convolutional layers, one or more pooling layers, and one or more fully connected linear layers of the at least one neural network.

Additionally or alternatively, using deep reinforcement learning in conjunction with at least one neural network to predict at least one impact of at least one device configuration change to the at least one device can include assigning one or more rewards and one or more penalties for impacts of device configuration changes to data center performance, wherein each reward is assigned for a positive impact on data center performance and each penalty is assigned for a negative impact on data center performance. Also, as detailed herein, in one or more embodiments, the at least one neural network can include one or more of at least one deep Q network and at least one convolutional neural network.

Step 406 includes performing at least one automated action based at least in part on the one or more determined device configurations. In at least one embodiment, performing the at least one automated action includes outputting identifying information for the one or more determined device configurations to at least one data center administrator. Additionally or alternatively, in one or more embodiments, performing the at least one automated action includes updating device configurations for the at least one device in the data center based on the one or more determined device configurations.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to determine device configurations by processing device change-related information and device telemetry data using one or more AI techniques. These and other embodiments can effectively overcome problems associated with timeliness and errors in data center management.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
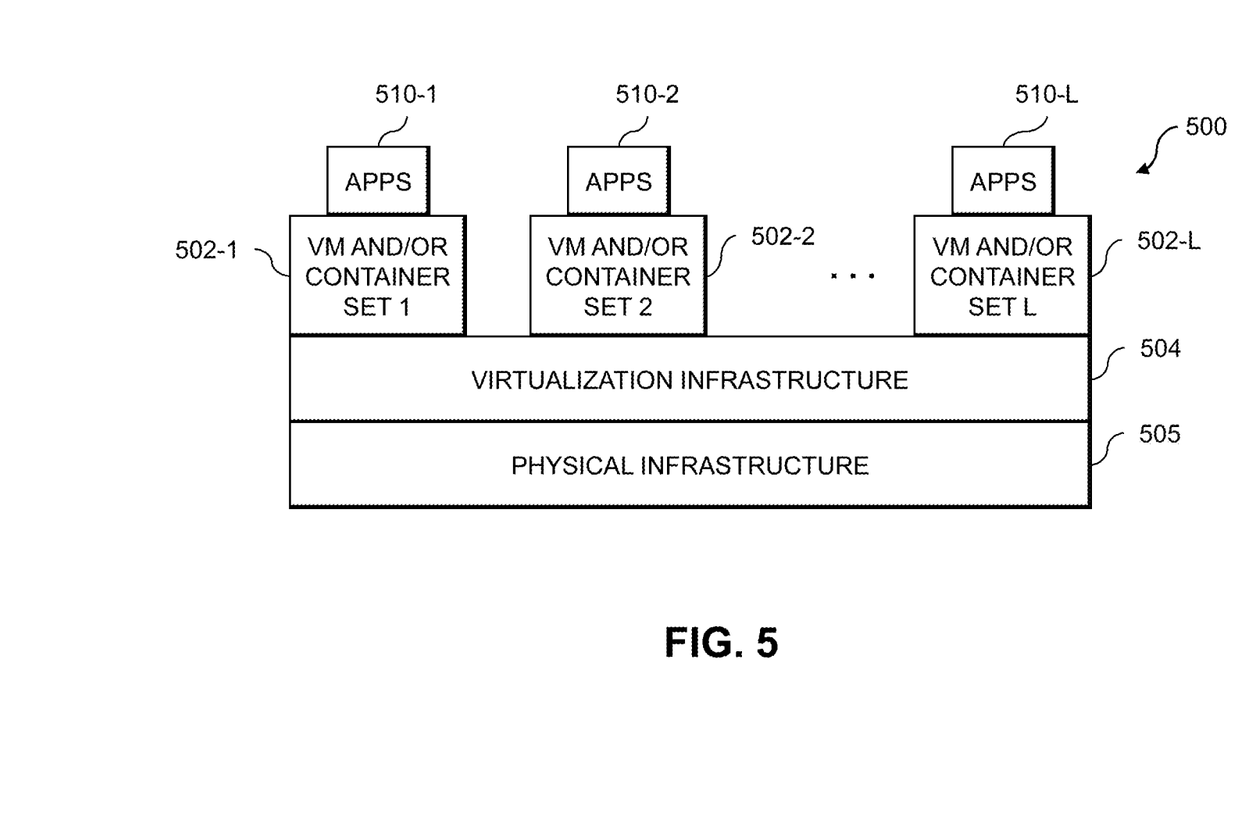
FIGS. 5 and 6 show examples of processing platforms that may be utilized to implement at least a portion of an information processing system in illustrative embodiments.
Figure 6:
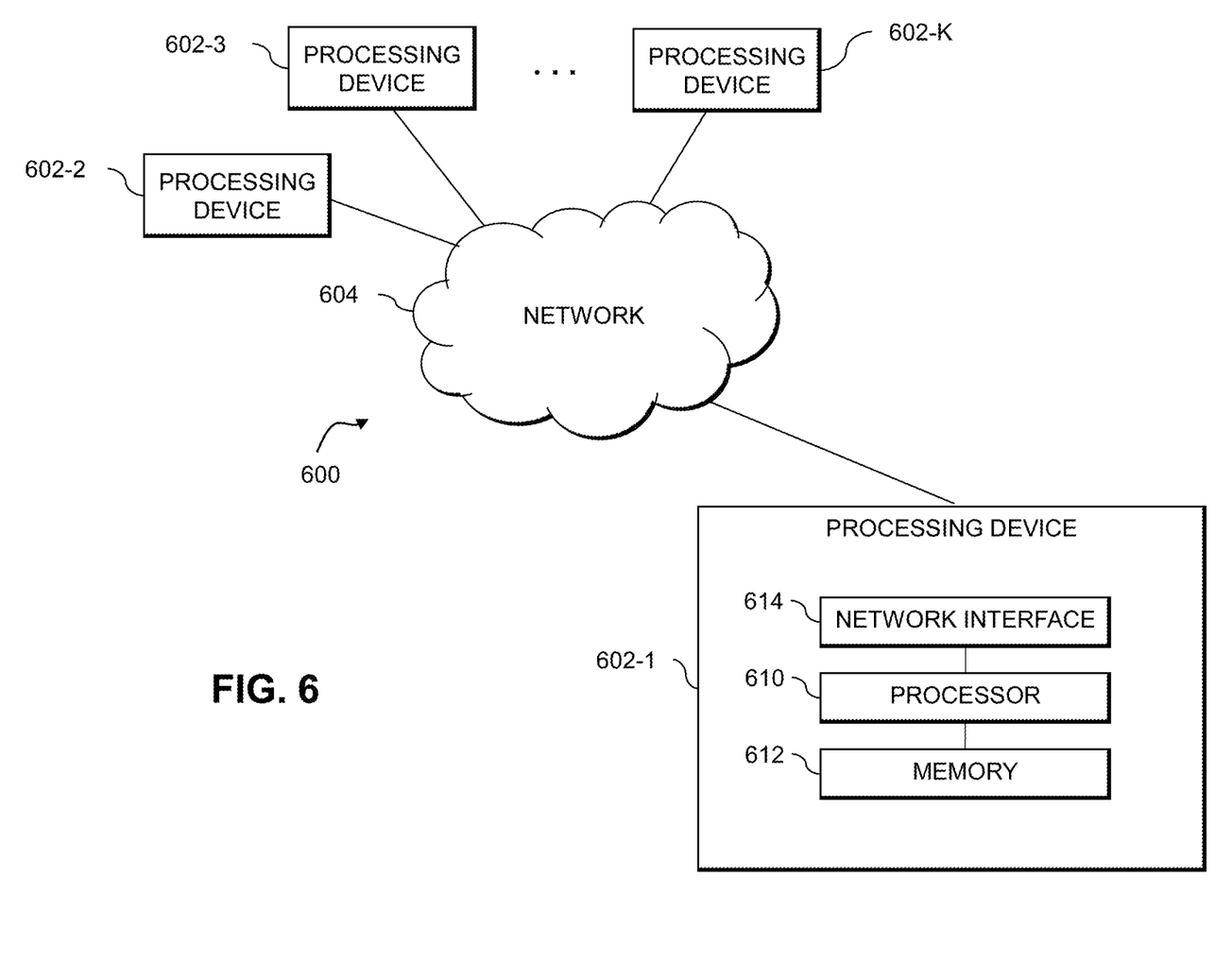

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining input information pertaining to one or more device-related changes to a data center;
   obtaining telemetry data attributed to one or more devices in the data center;
   determining one or more device configurations for implementation in at least one device in the data center in connection with the one or more device-related changes by processing the input information and the obtained telemetry data using one or more artificial intelligence techniques, wherein processing the input information and the obtained telemetry data comprises processing the input information and the obtained telemetry data using deep reinforcement learning in conjunction with at least one neural network to predict at least one impact of at least one device configuration change to performance of the data center, wherein using deep reinforcement learning in conjunction with at least one neural network comprises assigning one or more rewards and one or more penalties for impacts of device configuration changes to data center performance, wherein each reward is assigned to a device configuration change for at least one positive impact on data center performance and each penalty is assigned to a device configuration change for at least one negative impact on data center performance; and
   performing at least one automated action based at least in part on the one or more determined device configurations;
   wherein the method is performed by at least one processing device comprising a processor coupled to a memory.

2. The computer-implemented method of claim 1, wherein processing the input information and the obtained telemetry data using deep reinforcement learning in conjunction with at least one neural network comprises converting at least a portion of the input information and the obtained telemetry data into one or more multi-dimensional vectors.

3. The computer-implemented method of claim 2, further comprising:
   providing the one or more multi-dimensional vectors to the at least one neural network.

4. The computer-implemented method of claim 3, wherein providing the one or more multi-dimensional vectors to the at least one neural network comprises passing the one or more multi-dimensional vectors through one or more convolutional layers, one or more pooling layers, and one or more fully connected linear layers of the at least one neural network.

5. The computer-implemented method of claim 1, wherein the at least one neural network comprises one or more of at least one deep Q network and at least one convolutional neural network.

6. The computer-implemented method of claim 1, wherein the telemetry data measure hardware performance status associated with at least a portion of the data center at a given point of time.

7. The computer-implemented method of claim 1, wherein performing the at least one automated action comprises outputting identifying information for the one or more determined device configurations to at least one data center administrator.

8. The computer-implemented method of claim 1, wherein performing the at least one automated action comprises updating device configurations for the at least one device in the data center based on the one or more determined device configurations.

9. A non-transitory processor-readable storage medium having stored therein program code of one or more software programs, wherein the program code when executed by at least one processing device causes the at least one processing device:
   to obtain input information pertaining to one or more device-related changes to a data center;
   to obtain telemetry data attributed to one or more devices in the data center;
   to determine one or more device configurations for implementation in at least one device in the data center in connection with the one or more device-related changes by processing the input information and the obtained telemetry data using one or more artificial intelligence techniques, wherein processing the input information and the obtained telemetry data comprises processing the input information and the obtained telemetry data using deep reinforcement learning in conjunction with at least one neural network to predict at least one impact of at least one device configuration change to performance of the data center, wherein using deep reinforcement learning in conjunction with at least one neural network comprises assigning one or more rewards and one or more penalties for impacts of device configuration changes to data center performance, wherein each reward is assigned to a device configuration change for at least one positive impact on data center performance and each penalty is assigned to a device configuration change for at least one negative impact on data center performance; and to perform at least one automated action based at least in part on the one or more determined device configurations.

10. The non-transitory processor-readable storage medium of claim 9, wherein processing the input information and the obtained telemetry data using deep reinforcement learning in conjunction with at least one neural network comprises converting at least a portion of the input information and the obtained telemetry data into one or more multi-dimensional vectors.

11. The non-transitory processor-readable storage medium of claim 10, wherein the program code when executed by the at least one processing device further causes the at least one processing device:

to provide the one or more multi-dimensional vectors to the at least one neural network.

12. The non-transitory processor-readable storage medium of claim 11, wherein providing the one or more multi-dimensional vectors to the at least one neural network comprises passing the one or more multi-dimensional vectors through one or more convolutional layers, one or more pooling layers, and one or more fully connected linear layers of the at least one neural network.

13. An apparatus comprising:
at least one processing device comprising a processor coupled to a memory;
the at least one processing device being configured:
   to obtain input information pertaining to one or more device-related changes to a data center;
   to obtain telemetry data attributed to one or more devices in the data center;
   to determine one or more device configurations for implementation in at least one device in the data center in connection with the one or more device-related changes by processing the input information and the obtained telemetry data using one or more artificial intelligence techniques, wherein processing the input information and the obtained telemetry data comprises processing the input information and the obtained telemetry data using deep reinforcement learning in conjunction with at least one neural network to predict at least one impact of at least one device configuration change to performance of the data center, wherein using deep reinforcement learning in conjunction with at least one neural network comprises assigning one or more rewards and one or more penalties for impacts of device configuration changes to data center performance, wherein each reward is assigned to a device configuration change for at least one positive impact on data center performance and each penalty is assigned to a device configuration change for at least one negative impact on data center performance; and
   to perform at least one automated action based at least in part on the one or more determined device configurations.

14. The apparatus of claim 13, wherein processing the input information and the obtained telemetry data using deep reinforcement learning in conjunction with at least one neural network comprises converting at least a portion of the input information and the obtained telemetry data into one or more multi-dimensional vectors.

15. The apparatus of claim 14, wherein the at least one processing device is further configured:
   to provide the one or more multi-dimensional vectors to the at least one neural network.

16. The apparatus of claim 15, wherein providing the one or more multi-dimensional vectors to the at least one neural network comprises passing the one or more multi-dimensional vectors through one or more convolutional layers, one or more pooling layers, and one or more fully connected linear layers of the at least one neural network.

17. The apparatus of claim 13, wherein performing the at least one automated action comprises outputting identifying information for the one or more determined device configurations to at least one data center administrator.

18. The apparatus of claim 13, wherein performing the at least one automated action comprises updating device configurations for the at least one device in the data center based on the one or more determined device configurations.

19. The apparatus of claim 13, wherein the at least one neural network comprises one or more of at least one deep Q network and at least one convolutional neural network.

20. The apparatus of claim 13, wherein the telemetry data measure hardware performance status associated with at least a portion of the data center at a given point of time.

* * * * *